(12) United States Patent
Hsu et al.

(10) Patent No.: US 8,942,168 B2
(45) Date of Patent: Jan. 27, 2015

(54) PACKET FLOW PROCESSING IN A COMMUNICATION SYSTEM

(75) Inventors: Raymond T. Hsu, San Diego, CA (US); Jun Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 129 days.

(21) Appl. No.: 12/840,145

(22) Filed: Jul. 20, 2010

(65) Prior Publication Data

US 2011/0273984 A1 Nov. 10, 2011

Related U.S. Application Data

(60) Continuation of application No. 11/482,452, filed on Jul. 7, 2006, now Pat. No. 8,514,773, which is a division of application No. 10/227,074, filed on Aug. 23, 2002, now abandoned, which is a continuation-in-part of application No. 10/170,059, filed on Jun. 10, 2002, now Pat. No. 7,277,455.

(51) Int. Cl.
*H04W 4/00* (2009.01)
*H04L 12/26* (2006.01)
(Continued)

(52) U.S. Cl.
CPC ........... *H04W 28/12* (2013.01); *H04L 12/5695* (2013.01); *H04L 29/06* (2013.01); *H04L 29/06027* (2013.01); *H04L 45/302* (2013.01); *H04L 47/14* (2013.01); *H04L 47/2441* (2013.01); *H04L 47/2491* (2013.01); *H04L 47/724* (2013.01); *H04L 47/801* (2013.01); *H04L 47/805* (2013.01); *H04L 47/806* (2013.01); *H04L 47/808* (2013.01); *H04L 47/824* (2013.01); *H04L 47/826* (2013.01); *H04W 28/18* (2013.01); *H04L 65/1006* (2013.01); *H04L 65/607* (2013.01);
(Continued)

(58) Field of Classification Search
USPC ................ 370/328, 466, 236, 389, 349, 252; 709/227
See application file for complete search history.

(56) References Cited

U.S. PATENT DOCUMENTS 6,084,855 A 7/2000 Soirinsuo et al.
6,252,857 B1 6/2001 Fendick et al.
(Continued)

FOREIGN PATENT DOCUMENTS

JP 2000032056 1/2000
JP 2001156838 6/2001
(Continued)

OTHER PUBLICATIONS

1. Davie B; et al, "RFC 3006—Integrated Services in the Presence of Compressible Flows", XP002257047, Network Working Group Request for Comments, Nov. 1, 2000, pp. 1-13.
(Continued)

*Primary Examiner* — Michael Faragalla
(74) *Attorney, Agent, or Firm* — Anthony R. Morris

(57) ABSTRACT

Method and apparatus for processing packet flows in a communication system. In one embodiment, a resource reservation message includes packet flow parameter information used to determine flow treatment of the associated packet flow. The packet flow mapping is based on the quality of service of the associated packet flow. In another embodiment, a bearer connection is established and monitored for information relating to flow treatment.

29 Claims, 9 Drawing Sheets

(51) Int. Cl.
*H04W 28/12* (2009.01)
*H04L 12/54* (2013.01)
*H04L 29/06* (2006.01)
*H04L 12/725* (2013.01)
*H04L 12/801* (2013.01)
*H04L 12/851* (2013.01)
*H04L 12/857* (2013.01)
*H04L 12/913* (2013.01)
*H04L 12/927* (2013.01)
*H04L 12/911* (2013.01)
*H04W 28/18* (2009.01)
*H04W 28/06* (2009.01)
*H04W 28/10* (2009.01)
*H04W 28/26* (2009.01)
*H04L 29/08* (2006.01)

(52) U.S. Cl.
CPC ............... *H04L 65/80* (2013.01); *H04L 69/04* (2013.01); *H04W 28/06* (2013.01); *H04W 28/10* (2013.01); *H04W 28/26* (2013.01); *H04L 67/2819* (2013.01); *H04L 69/22* (2013.01)
USPC .......................................... 370/328; 370/252

(56) References Cited

U.S. PATENT DOCUMENTS

| | | | |
|---|---|---|---|
| 6,366,577 | B1 | 4/2002 | Donovan |
| 6,415,313 | B1 | 7/2002 | Yamada et al. |
| 6,882,643 | B1* | 4/2005 | Mauger et al. ............. 370/389 |
| 7,145,919 | B2 | 12/2006 | Krishnarajah et al. |
| 7,167,447 | B2 | 1/2007 | Puuskari et al. |
| 7,227,865 | B2 | 6/2007 | Shaheen et al. |
| 7,277,455 | B2 | 10/2007 | Hsu et al. |
| 7,826,603 | B1 | 11/2010 | Denman et al. |
| 2001/0027490 | A1 | 10/2001 | Fodor et al. |
| 2002/0032800 | A1 | 3/2002 | Puuskari et al. |
| 2002/0126701 | A1 | 9/2002 | Requena |
| 2002/0191556 | A1* | 12/2002 | Krishnarajah et al. ........ 370/329 |
| 2003/0035401 | A1 | 2/2003 | Shaheen et al. |
| 2003/0081592 | A1* | 5/2003 | Krishnarajah et al. ........ 370/352 |
| 2003/0123388 | A1* | 7/2003 | Bradd ....................... 370/230 |
| 2003/0189900 | A1* | 10/2003 | Barany et al. .............. 370/229 |
| 2004/0008632 | A1 | 1/2004 | Hsu et al. |
| 2004/0047366 | A1* | 3/2004 | Chowdhury ................ 370/466 |
| 2004/0059820 | A1* | 3/2004 | Holden et al. .............. 709/227 |
| 2005/0207429 | A1 | 9/2005 | Akita et al. |
| 2006/0126589 | A1 | 6/2006 | Sayeedi |
| 2006/0256719 | A1 | 11/2006 | Hsu et al. |

FOREIGN PATENT DOCUMENTS

| | | |
|---|---|---|
| JP | 2002010341 A | 1/2002 |
| TW | 345784 | 11/1998 |
| TW | 435023 | 5/2001 |
| TW | 480858 | 3/2002 |
| TW | 486897 | 5/2002 |

OTHER PUBLICATIONS

3GPP TS 24.228 v5.0.0: 3rd Generation Partnership Project; Technical Specification Group Core Network; Signaling flows for the IP multimedia call control based on SIP and SDP; Stage 3 (Release 5), pp. 1-108, (Mar. 2002) XP-02265154.
Braden, R., "Resource ReSerVation Protocol (RSVP)—Ver. 1 Functional Specification". IETF, Network Working Group, Request for Comments: 2205, pp. 1-105 (Sep. 1997).
Camarillo, G.: "Compressing the Session Initiation Protocol (SIP)", IETF Internet Draft (May 2002).
Casner, S. et al.: "Compressing IP/UDP/RTP Headers for Low-Speed Serial Links", IETF Network Working Group, RFC 2508 (Feb. 1999).
Chowdhury, K.: "Dynamic IP flow to Service Instance mapping in the cdma2000 IP network," 3GPP2 TSG-P contribution 3GPP2-P00-20020513-019 by Nortel Networks (May 2002).
European Search Report—EP10172625, Search Authority—Munich Patent Office, Dec. 8, 2010.
International Preliminary Examination Report—PCT/US03/018214—International Search Authority US—Jan. 30, 2006.
International Search Report—PCT/US03/018214—International Search Authority, European Patent Office, Jan. 27, 2004.
Parameshwar N; Aravamudhan L; Reece C. "Advanced SIP Series: SIP and 3GPP Operations", XP002226653, Jan. 9, 2003.
Rosenberg, J., et al., "SIP: Locating SIP Servers," IETF Internet Draft SIP WG, Feb. 27, 2002, pp. 1-17.
Rosenberg, J., et al:RFAC 3261: "SIP: Session Initiation Protocol" Jun. 1, 2002, pp. 1-270, XP015009039.
Written Opinion—PCT/US03/018214—International Search Authority US—Sep. 28, 2005.

\* cited by examiner

PACKET FLOW PROCESSING IN A COMMUNICATION SYSTEM

CLAIM OF PRIORITY UNDER 35 U.S.C. §120

The present Application for Patent is a Continuation of and claims priority to patent application Ser. No. 11/482,452 entitled "Packet Flow Processing in a Communication System" filed Jul. 7, 2006 which is a Divisional of and claims priority to patent application Ser. No. 10/227,074 entitled "PACKET FLOW PROCESSING IN A COMMUNICATION SYSTEM" filed Aug. 23, 2002, now abandoned, which is a Continuation-in-Part and claims priority to patent application Ser. No. 10/170,059 entitled "PACKET FLOW PROCESSING IN A COMMUNICATION SYSTEM" filed Jun. 10, 2002, now U.S. Pat. No. 7,277,455 and all assigned to the assignee hereof and all hereby expressly incorporated by reference herein.

BACKGROUND

1. Field

The present invention relates to packet flow processing in a communication system, and more specifically to packet flow mapping and treatment to support multiple service instances in a communication system having an Internet Protocol (IP) component.

2. Background

Communication systems supporting data communications often include an Internet Protocol (IP) component or portion, wherein data is communicated in an IP format. Similarly, a communication system may be in communication with an IP system, or may participate in a communication with an IP node. For such communications, data is transported in packets; a sequence of packets is referred to as a "packet flow." In order to process the packet flow, the infrastructure element(s) of a communication system require certain information. For example, the infrastructure element(s) may need header compression and/or mapping information so that the infrastructure element(s) can direct the packet flows to appropriate link-layer connections.

There is therefore a need in the art to provide packet flow information to the infrastructure elements requiring such information. Similarly, there is a need for an efficient method for mapping and treatment of packet flows in a communication system.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
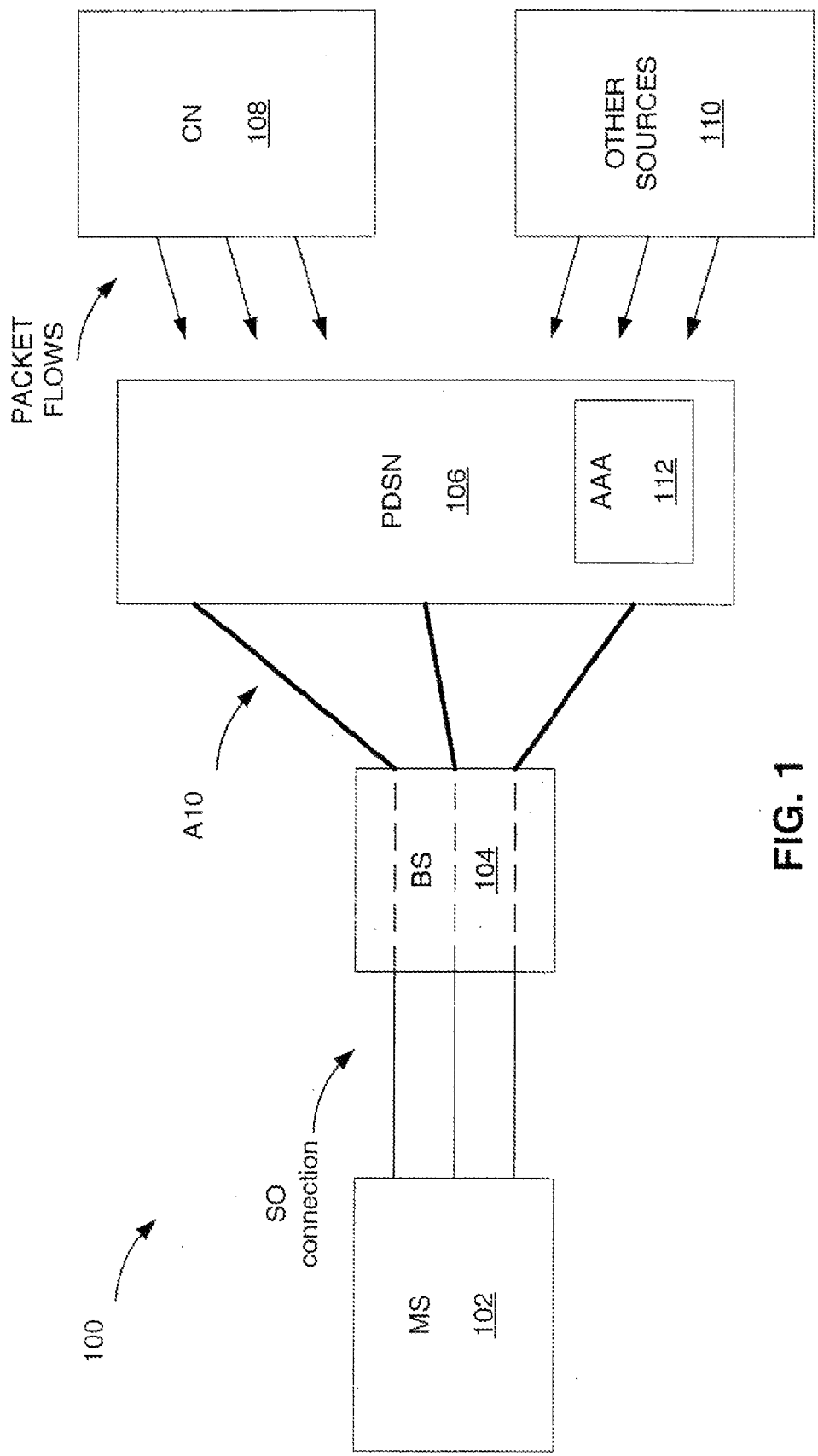
FIG. 1 is a communication system.

FIG. 1 is a communication system 100 adapted for data communications. The communication system 100 includes a Mobile Station (MS) 102 in communication with a Base Station (BS) 104. The BS 104 is further in communication with a Packet Data Service Node (PDSN) 106, as well as with other components for processing voice communications, etc. (not shown). The PDSN 106 serves as an interface for the MS 102 and the BS 104 with data networks, such as networks supporting IP communications.

The MS 102 supports data communications, wherein several A10 connections and Service Option (SO) connections are illustrated. A SO connection is used for communication of a selected Service Option, such as packet data services. An A10 connection then provides a link for sending Internet Protocol (IP) packets between the PDSN 106 and BS 104. The SO connection provides a link for sending IP packets between the MS 102 and BS 104. There is a one-to-one mapping between the SO connection (MS-BS) and A10 connection (BS-PDSN). Multiple A10/SO connection pairs are illustrated in FIG. 1, as the MS 102 supports multiple simultaneous connections. In other words, the MS 102 is able to process multiple packet flows in parallel. Each packet flow is assigned to an A10 connection or link. The assignment of a packet flow to an A10 link is referred to as packet flow "mapping" and is determined by the PDSN. There are a variety of criteria and algorithms for such mapping that are applicable in the system 100 of FIG. 1.

As discussed hereinabove, each SO connection or link between the MS 102 and BS 104 has a corresponding A10 connection or link between the BS 104 and the PDSN 106. The correspondence is illustrated by the dashed lines through BS 104. SO/A10 connections may be used for a bi-directional or interactive communication, such as a Voice over IP (VoIP) communication, or may be used for a uni-directional communication, such as to download data or for the streaming of information from an Internet source. As the number of type of data communications increases, SO/A10 connections may be implemented for more and more of these communications. Note that multiple SO connections (a.k.a. service instances) are needed to support different QoS requirements of packet flows. For example, the MS 102 may have two active SO connections. The first SO connection having retransmission mechanisms to provide reliable transport over the air at the cost of transmission latency, and, therefore, is used for transporting data that requires reliable transmission. The second SO connection may not have retransmission mechanisms and is used for transporting data that requires expedited transmission.

The PDSN 106 further includes the Authentication Accounting and Authorization (AAA) 112. The AAA 112 serves to authenticate connections and keep track of the accounting for billing, etc. by the carrier or service provider. The PDSN 106 receives packet flows from a Corresponding Node (CN) 108 as well as from other sources 110. The CN 108 may be a node on the Internet, a service provider, a terminal, etc. In other words, the CN 108 is a source of information or a participant to a communication. Note that the PDSN 106 may receive multiple f packet flows from multiple sources, wherein said packet flows are destined for multiple participants, such as MS 102. Each packet flow is mapped to a corresponding SO/A10 connection and is processed according to the parameters negotiated by the participants.

The flow mapping and treatment of each packet flow is particularly important when multiple service instances are set up to a given user, such as MS 102. If the MS 102 has multiple active service instances and the MS 102 uses multiple header compression algorithms, the PDSN 106 will desire information for processing the packet flows associated with each service instance. Information includes, but is not limited to, the specific header compression algorithms used for each packet flow, and the mapping of each packet flow to each A10 connection.

The embodiment described herein below is one method that provides flow treatment information via an RSVP message that contains a new object called the flow treatment. The RSVP message is a resource reservation setup protocol designed for integrated services on the Internet, and is described in RFC 2205 entitled "Resource ReSerVation Protocol (RSVP)" by R. Branden, et al. The RSVP protocol is used by a host to request specific qualities of service from the network for particular application data streams or flows. RSVP is also used by routers to deliver Quality-of-Service (QoS) requests to all nodes along the path(s) of the flows and to establish and maintain state to provide the requested service. RSVP requests will generally result in resources being reserved in each node along the data path. The RSVP message provides packet filters for bi-directional packet flows (e.g., interactive VoIP session) or uni-directional packet flows (e.g., streaming session). Packet filters are used by a node to recognize a particular packet flow.

RSVP defines a "session" to be a data flow with a particular destination and transport-layer protocol. RSVP treats each session independently. An RSVP session is defined by the triple: (DestAddress, ProtocolId [DstPort]). Here DestAddress, the IP destination address of the data packets, may be a unicast or multicast address. ProtocolId is the IP protocol ID. The optional DstPort parameter is a "generalized destination port", i.e., some further demultiplexing point in the transport or application protocol layer. DstPort could be defined by a User Datagram Protocol/Transmission Control Protocol (UDP/TCP) destination port field, by an equivalent field in another transport protocol, or by some application-specific information.

Figure 4:
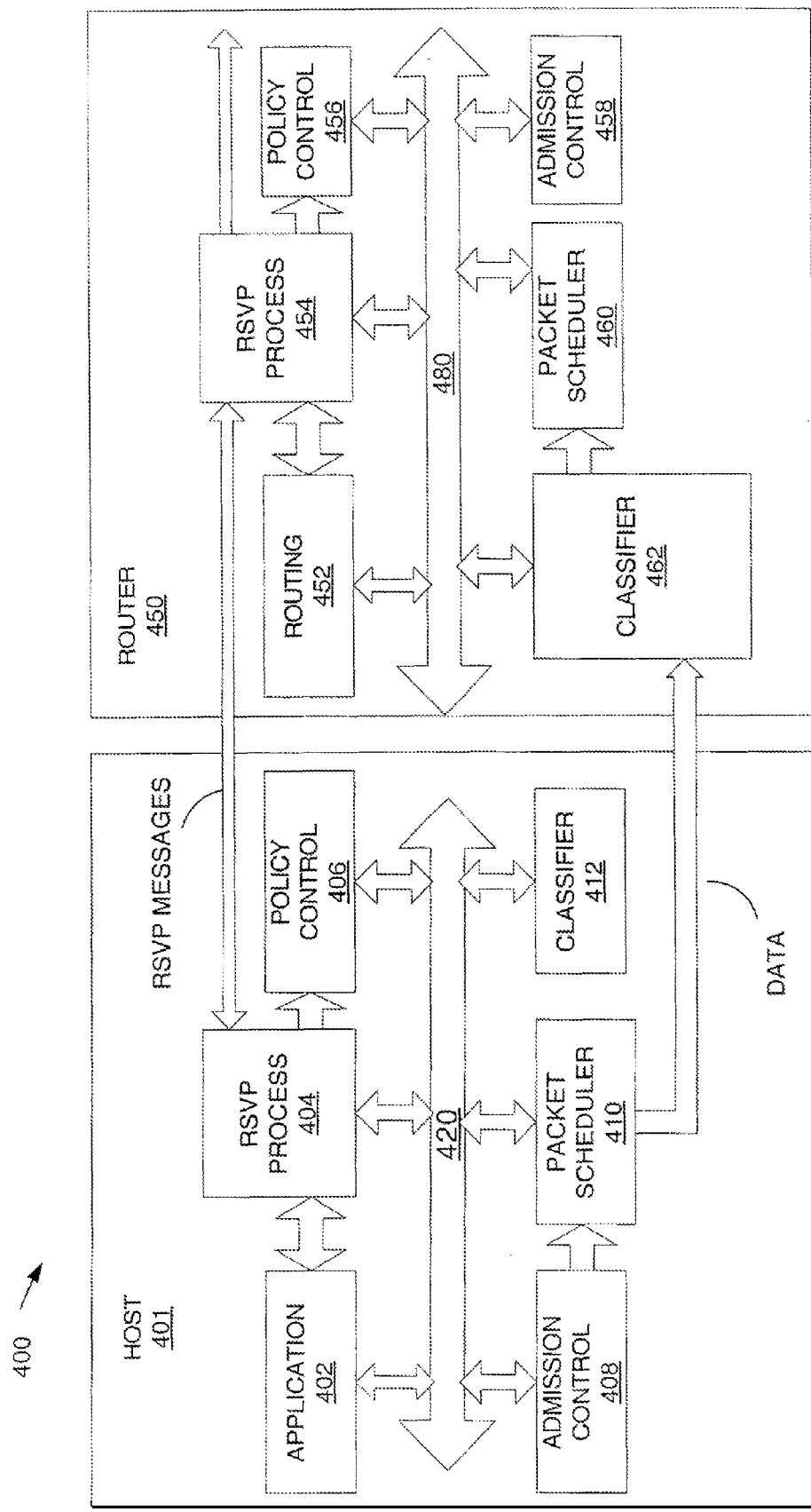
FIG. 4 illustrates a communication system supporting Resource Reservation Protocol.

Upon establishment of a main service instance, when the MS 102 decides to setup an auxiliary service instance, the MS 102 sends an RSVP PATH and RESV Messages to request Quality of Service (QoS) resources. In the RSVP RESV Message, the MS 102 will characterize the packet flow via IP addresses and port numbers and conveys the codec type and header compression type. Upon receiving the RSVP RESV Message, the PDSN will examine the information and request a new A10 connection to BS and associate the newly-established A10 connection with the packet flow characterized by the Filter Spec and optionally the Session Class (defined hereinbelow with respect to the RSVP type protocols). FIG. 4 details the format of an RSVP message consistent with RFC 2205. The RSVP message is illustrated as an example of a message that may be used for transmission of the information needed by the PDSN for packet flow treatment and/or mapping. Alternate embodiments may implement other messages to provide the same or similar information.

Note that throughout the discussion of RSVP type protocols, directional terms are defined according to the direction of the flow of data. RSVP messages carrying reservation requests originate at receivers and are passed upstream towards the sender(s). Specifically, the directional terms "upstream" vs. "downstream", "previous hop" vs. "next hop", and "incoming interface" vs. "outgoing interface" are defined with respect to the direction of data flow.

FIG. 4 illustrates a communication system having a host 401 and a router 450 implementing the RSVP protocol. As illustrated, the host 401 includes an application unit 404 bidirectionally coupled to an RSVP process unit 404. The RSVP process unit determines the appropriate RSVP message and content for transmission and also considers those RSVP messages and content received from the router 450. The RSVP process unit 404 is coupled to a policy control unit 506. Communication within the host 401 is via a communication bus 420. The host 401 further includes an admission control unit 408, a packet scheduler 410, and a classifier 412.

Continuing with FIG. 4, the router 450 includes similar units as in the host 401, however the configuration may be implemented in a slightly different manner. The router 450 includes routing unit 452, RSVP process unit 454, policy control unit 456, admission control unit 458, packet scheduler 460, classifier 462, all in communication via communication bus 480. Note that RSVP process unit 404 communicates RSVP messages to and from RSVP process unit 454.

Within system 400, Quality of service is implemented for a particular data flow by mechanisms collectively called "traffic control". These mechanisms include (1) a packet classifier (classifier 412, 462), (2) admission control (admission control 408, 458), and (3) a "packet scheduler" (packet scheduler 410, 460) or some other link-layer-dependent mechanism to determine when particular packets are forwarded. The "packet classifier" mechanism or classifier 412, 462 determines the QoS class (and perhaps the route) for each packet. For each outgoing interface, the "packet scheduler" or other link-layer-dependent mechanism achieves the promised QoS. Traffic control implements QoS service models defined by the Integrated During reservation setup, an RSVP QoS request is passed to two local decision modules, "admission control" (admission control 408, 458) and "policy control" (406, 456). Admission control 408, 458 determines whether the node has sufficient available resources to supply the requested QoS. Policy control (406, 456) determines whether the user has administrative permission to make the reservation. If both checks succeed, parameters are set in the packet classifier and in the link layer interface (e.g., in the packet scheduler) to obtain the desired QoS. If either check fails, the RSVP program returns an error notification to the application process that originated the request.

RSVP protocol mechanisms provide a general facility for creating and maintaining distributed reservation state across a mesh of multicast or unicast delivery paths. RSVP itself transfers and manipulates QoS and policy control parameters as opaque data, passing them to, the appropriate traffic control and policy control modules for interpretation. Since the membership of a large multicast group and the resulting multicast tree topology are likely to change with time, the RSVP design assumes that state for RSVP and traffic control state is to be built and destroyed incrementally in routers and hosts. For this purpose, RSVP establishes "soft" state; that is, RSVP sends periodic refresh messages to maintain the state along the reserved path(s). In the absence of refresh messages, the state automatically times out and is deleted. In summary, RSVP has the following attributes:

1. RSVP makes resource reservations for both unicast and many-to-many multicast applications, adapting dynamically to changing group membership as well as to changing routes.
2. RSVP is simplex, i.e., supports reservations for unidirectional data flows.
3. RSVP is receiver-oriented, i.e., the receiver of a data flow initiates and maintains the resource reservation used for that flow.

4. RSVP maintains "soft" state in routers and hosts, providing graceful support for dynamic membership changes and automatic adaptation to routing changes.
5. RSVP is not a routing protocol but supports present and future routing protocols.
6. RSVP transports and maintains traffic control and policy control parameters that are opaque to RSVP.
7. RSVP provides several reservation models to fit a variety of applications.
8. RSVP provides transparent operation through routers that do not support RSVP.
9. RSVP supports both IPv4 and IPv6.

An elementary RSVP reservation request consists of a "flowspec" together with a "filter spec"; the pair is called a "flow descriptor". The flowspec specifies a desired QoS. The filter spec, together with a session specification, defines the set of data packets—the "flow"—to receive the QoS defined by the flowspec. The flowspec is used to set parameters in the node's packet scheduler or other link layer mechanism, while the filter spec is used to set parameters in the packet classifier. Data packets that are addressed to a particular session but do not match any of the filter specs for that session are handled as best-effort traffic.

The flowspec in a reservation request will generally include a service class and two sets of numeric parameters: (1) an "Rspec" (R for 'reserve') that defines the desired QoS, and (2) a "Tspec" (T for 'traffic') that describes the data flow. The formats and contents of Tspecs and Rspecs are determined by the system and are generally opaque to RSVP.

The exact format of a filter spec depends upon which IP version is in use. Current versions consider IPv4 or IPv6. According to one approach, filter specs may select arbitrary subsets of the packets in a given session. Such subsets might be defined in terms of senders (i.e., sender IP address and generalized source port), in terms of a higher-level protocol, or generally in terms of any fields in any protocol headers in the packet. For example, filter specs might be used to select different subflows of a hierarchically-encoded video stream by selecting on fields in an application-layer header. In the interest of simplicity (and to minimize layer violation), the basic filter spec format defined in the current RSVP specification has a very restricted form: sender IP address and optionally the UDP/TCP port number SrcPort.

At each intermediate node, a reservation request triggers two general actions, as follows:

1. Make a Reservation on a Link:
The RSVP process passes the request to admission control and policy control. If either test fails, the reservation is rejected and the RSVP process returns an error message to the appropriate receiver(s). If both succeed, the node sets the packet classifier to select the data packets defined by the filter spec, and it interacts with the appropriate link layer to obtain the desired QoS defined by the flowspec.

The detailed rules for satisfying an RSVP QoS request depend upon the particular link layer technology in use on each interface. For a simple leased line, the desired QoS will be obtained from the packet scheduler in the link layer driver, for example. If the link-layer technology implements its own QoS management capability, then RSVP negotiates with the link layer to obtain the requested QoS. Note that the action to control QoS occurs at the place where the data enters the link-layer medium, i.e., at the upstream end of the logical or physical link, although an RSVP reservation request originates from receiver(s) downstream.

2. Forward the Request Upstream:
A reservation request is propagated upstream towards the appropriate senders. The set of sender hosts to which a given reservation request is propagated is called the "scope" of that request.

The reservation request that a node forwards upstream may differ from the request that it received from downstream, for two reasons. The traffic control mechanism may modify the flowspec hop-by-hop. More importantly, reservations from different downstream branches of the multicast tree(s) from the same sender (or set of senders) must be "merged" as reservations travel upstream.

When a receiver originates a reservation request, it can also request a confirmation message to indicate that its request was (probably) installed in the network. A successful reservation request propagates upstream along the multicast tree until it reaches a point where an existing reservation is equal or greater than that being requested. At that point, the arriving request is merged with the reservation in place and need not be forwarded further; the node may then send a reservation confirmation message back to the receiver.

There are two fundamental RSVP message types: RESV and PATH. Each receiver host sends RSVP reservation request (RESV) messages upstream towards the senders. These messages must follow exactly the reverse of the path(s) the data packets will use, upstream to all the sender hosts included in the sender selection. The RESV message results in creation and maintenance of a "reservation state" in each node along the path(s). RESV messages are finally delivered to the sender hosts themselves, so that the hosts can set up appropriate traffic control parameters for the first hop along the path.

Each RSVP sender host transmits RSVP "PATH" messages downstream along the uni-/multicast routes provided by the routing protocol(s), following the paths of the data. These RSVP PATH messages store a "path state" in each node along the way. This path state includes at least the unicast IP address of the previous hop node, which is used to route the RESV messages hop-by-hop in the reverse direction. Note that future designs may implement routing protocols that supply reverse path forwarding information directly, replacing the reverse-routing function of path state.

A PATH message contains the following information in addition to the previous hop address:

1. Sender Template
A PATH message is required to carry a Sender Template, which describes the format of data packets that the sender will originate. This template is in the form of a filter spec that could be used to select this sender's packets from others in the same session on the same link. Sender Templates have exactly the same expressive power and format as filter specs that appear in Resv messages. Therefore a Sender Template may specify only the sender IP address and optionally the UDP/TCP sender port, and assuming the protocol Id specified for the session.

2. Sender Tspec
A PATH message is required to carry a Sender Tspec, which defines the traffic characteristics of the data flow that the sender will generate. This Tspec is used by traffic control to prevent over-reservation, and perhaps unnecessary Admission Control failures.

3. Adspec
A Path message may carry a package of OPWA advertising information, known as an "Adspec". An Adspec received in a PATH message is passed to the local traffic control, which returns an updated Adspec; the updated version is then forwarded in PATH messages sent downstream. PATH messages are sent with the same source and destination addresses as the data, so that they will be routed correctly through non-RSVP cloud. On the other hand, RESV messages are sent hop-by-hop; each RSVP-speaking node forwards a RESV message to the unicast address of a previous RSVP hop.

Figure 2:
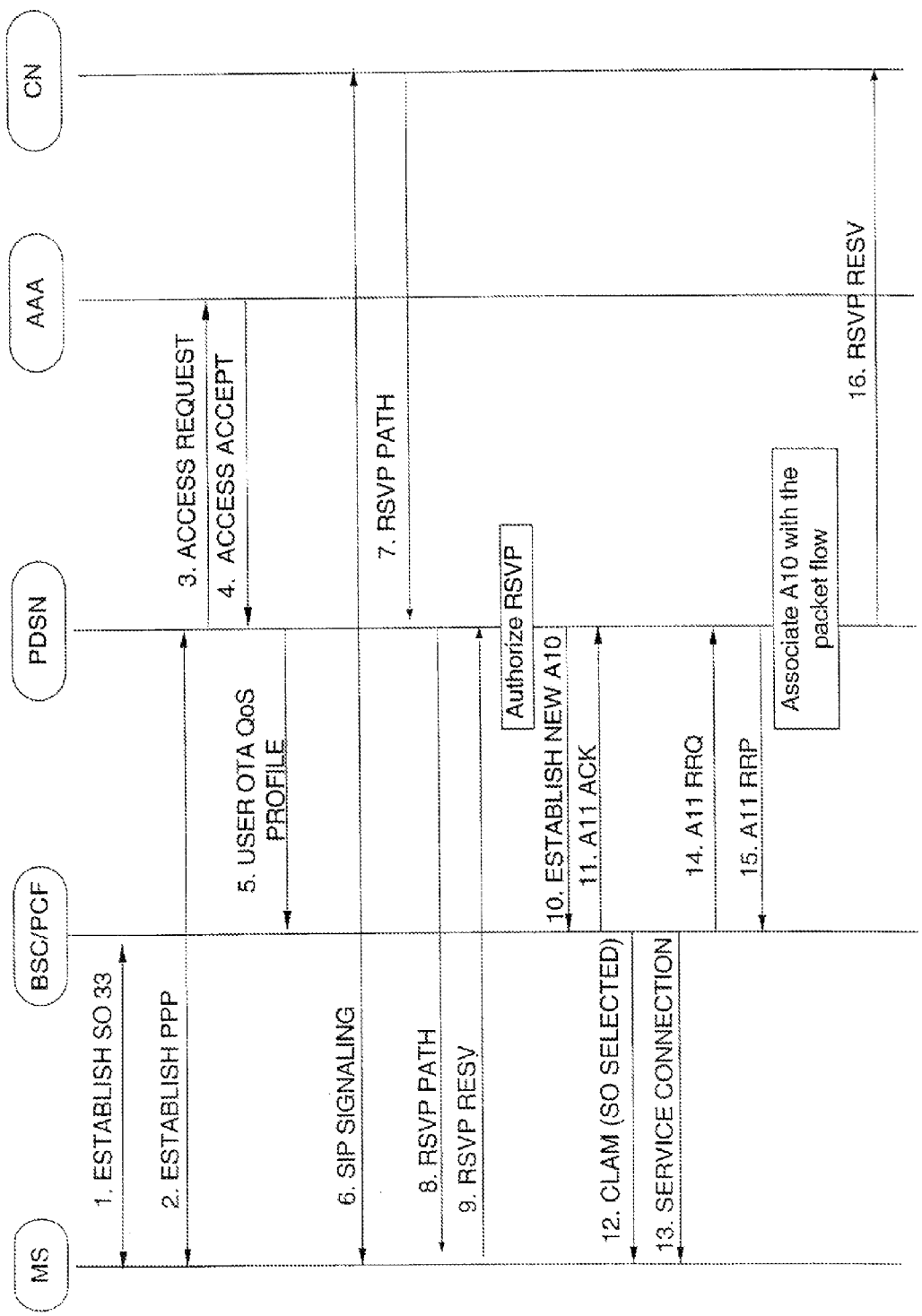
FIG. 2 is a call flow for a processing wherein a PDSN determines the flow treatment and the mapping for a packet flow from RSVP message(s).

FIG. 2 illustrates bi-directional, interactive call processing between a MS 102, BS 104 (which includes Packet Control Function (PCF) operations), PDSN 106, AAA 108, and CN 110. The flow is described chronologically in steps labeled (in FIG. 2) from 1 to 16.

At a step 1, before the mobile can send Session Initiation Protocol (SIP) signaling triggered by applications, the MS establishes a Service Option (SO), such as for packet data services SO 33. In the example illustrated, the Radio Link Protocol (RLP) retransmissions enabled. This provides a mechanism for the SIP messages to be transported reliably over the air. Note that SIP is detailed in "SIP: Session Initiation Protocol" by J. Rosenberg, et al., published by the Internet Engineering Task Force having document no. draft-ietf-sip-rfc2543bis-08.ps, dated Feb. 21, 2002; and also in "SIP: Session Initiation Protocol" by M. Handley et al., published by the Network Working Group having document no. RFC 2543, dated March 1999.

The Session Initiation Protocol (SIP) is an application-layer control (signaling) protocol for creating, modifying, and terminating sessions with one or more participants. These sessions include Internet telephone calls, multimedia distribution, and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols.

At step 2, the MS establishes a Point-to-Point (PPP) session with PDSN. This provides the bearer connection for the link layer, allowing establishment of connections for packet flows. Note that PPP is detailed in "The Point-to-Point Protocol (PPP)" by W. Simpson, published by Network Working Group as RFC 1661, dated July 1994.

At step 3, the PDSN sends an Access Request to the AAA containing the MS Network Access Identifier (NAI) and a credential. The NAI is a unique identifier for the MS. The credential is an authenticator computed by the MS in response to a Challenge Handshake Authentication Protocol (CHAP) (if Simple IP is used) or a Foreign Agent Challenge (if Mobile IP is used).

At step 4, if the mobile is authenticated successfully, the AAA sends an Access Accept containing the user subscription profile. The profile consists of two parts: an Over The Air (OTA) component; and an IP component.

At step 5, the PDSN receives and caches the user IP subscription profile and forwards the user OTA subscription profile to the BS At step 6, the mobile sends SIP signaling via PPP/SO33. The SIP signaling serves to set up a virtual bearer connection with the CN. This is an IP bearer connection through which the packet flow will be transported.

At step 7, triggered by the SIP signaling (e.g., 183 Session Progress), the CN sends an RSVP PATH message toward the MS. In the RSVP Path Message, the CN includes the standard RSVP objects Sender Template and Sender Traffic Spec (Tspec) that characterize the packet flow that will be generated by the CN. At step 8, the PDSN forwards the RSVP PATH message to the MS. At step 9, upon receiving the RSVP PATH message, the MS uses the information contained in the message to calculate the desired QoS parameters (i.e., bandwidth and delay) for receiving the packet flow. The mobile then sends an RSVP RESV message to reserve resource along the path to the CN. The RSVP RESV message contains the flowspec, filter spec, and the treatment spec, which is a new RSVP object specific to systems supporting the standard offered by a consortium named "3rd Generation Partnership Project 2" referred to herein as 3GPP2, and TR-45.5 referred to herein as the cdma2000 standard.

The flowspec specifies a desired QoS. The flowspec is used to set parameters in the node's packet scheduler or other link layer mechanism. The flowspec in a reservation request will generally include a service class and two sets of numeric parameters: (1) an "Rspec" (R for 'reserve') that defines the desired QoS, and (2) a "Tspec" (T for 'traffic') that describes the data flow. The formats and contents of Tspecs and Rspecs are determined by the integrated service models and are generally opaque to RSVP.

The filter spec defines the packet filters for the packet flow whose QoS is defined by the flowspec. The filter spec is used to set parameters in the packet classifier. Data packets that are addressed to a particular session but do not match any of the filter specs for that session are handled as best-effort traffic.

The treatment spec, which is a new RSVP object, conveys the header compression type that should be used on the packet flow.

Upon receiving the RSVP RESV message, the PDSN performs authorization based on the PDSN loading and local policy, mobile reachability, and user's IP subscription profile. If the PDSN rejects the RSVP RESV message, the PDSN sends an RSVPTear message toward the CN and a PATHTear message toward the MS. Else if the RSVP RESV is authorized, the PDSN examines the treatment spec of the RSVP RESV message. The treatment spec contains the header compression type that the MS wants to use on the packet flow. The PDSN determines whether or not a new A10 connection is needed. If needed, the PDSN sends an A11 Registration Update (RUP) Message to BS to request for a new A10 connection in step 10.

For example: If the header compression type is LLAROHC, the PDSN provides notification, via A11, to the BS to establish a new A10 connection and initiate the establishment of the selected service option instance, such as SO 61, with the MS.

If the header compression type is ROHC, the PDSN sends notification, via A11, to the BS to establish a new A10 connection and initiate the establishment of auxiliary service option instance, such as SO 33, (without RLP retransmissions) with the MS.

The association between header compression type and SO can be done in PDSN or BS. If the association is done in the PDSN, then the A11 RUP message will contain the SO number, and the BS uses it to initiate the service negotiation with the MS. If the association is done in the BS, then the A11 RUP message will contain the header compression type, and the BS will associate it with a SO number and uses it to initiate the service negotiation with the MS.

At step 11, the BS responds with A11 Registration Acknowledgement (RACK) Message. At step 12, the BS attempts to connect the SO specified in A11 signaling message to the MS via Call Assignment Message (CLAM). At step 13, the BS connects the SO selected. At step 14, the BS sends an A11 RRQ (Registration Request) to establish an A10 connection. At step 15, the PDSN responds with an A11 RRP (Registration Reply).

At step 16, upon successful establishment of the new A10 connection, the PDSN associates the newly established A10 connection with the packet filters obtained from the filter spec of the RSVP RESV message in step 9. This allows the PDSN to perform flow mapping on the packet flow that fits the description of the packet filters. The PDSN removes the treatment spec from the RSVP RESV message and sends it toward the CN. If for some reason(s) the new A10 connection is not established after a timeout, the PDSN sends PATHTear message toward the MS.

From this point the packet flow is processed from the CN to the MS via the PDSN. The PDSN performs the appropriate header compression on the packet flow and forward the packet flow to the appropriate A10 connection.

Note that FIG. 2 illustrates an uni-directional communication from the CN to MS. For interactive bi-directional communication between the CN and MS, both the MS and the CN are sources and destinations. Therefore, in addition to the steps illustrated in FIG. 2 and detailed hereinabove, symmetrical steps are initiated from the MS. For example, the MS also sends an RSVP Path message. Similarly, the PDSN forwards the RSVP Path message to the CN. The CN provides an RSVP RESV message; and the PDSN forwards the RSVP RESV message to the MS. The RSVP RESV message from the CN will not necessarily trigger the PDSN to request A10 connection establishment as in step 10.

For the situation of an existing A10 connection for an auxiliary SO 33 with no RLP retransmission enabled, one embodiment utilizes the existing connection. According to an alternate embodiment, the BS establishes another auxiliary SO 33 with the MS. In this case, if the MS refuses, then the existing auxiliary SO 33 is used to also transport the new codec.

FIG. 2 illustrates call flow in a spread-spectrum communication system adapted for IP communications, and capable of processing packet flows. Alternate communication systems may be employed to provide the information necessary for processing a packet flow. Such information is not limited to the specific information detailed in the example, but may include any information needed or desired by the system components. Similarly, the order of steps may be altered according to the design and needs of a given system. The call flow of FIG. 2 is provided as examples of packet flow processing.

The embodiment described herein below is another method that provides flow treatment and flow mapping information via an RSVP message. The flow treatment and mapping information can be derived from the standard RSVP objects conveyed in the RSVP RESV message, and no new RSVP object needs to be defined as in the previous method.

The call flow is the same as in FIG. 2. One difference is that in step 9, the RSVP RESV message only contains the flowspec and filter spec. There is no treatment spec that explicitly tells the PDSN what header compression type should be used on the packet flow. Instead, the PDSN uses the flowspec to determine the header compression type implicitly.

The flowspec includes the Reservation Spec (Rspec) and Traffic Spec (Tspec). The Rspec describes the service rate, and the Tspec describes the token bucket parameters (bucket rate, peak rate, bucket dept, maximum packet size) to characterize the traffic that the CN will generate. The Rspec and Tspec together characterize a CDMA voice codec (e.g., 13-kbps PureVoice, 8-kbps EVRC, 8-kbps SMV, or 4-kbps SMV) that outputs a voice frame every 20 ms. The PDSN is configured to recognize CDMA voice codec based on the parameter values in the flowspec. If there is a match, and the MS is capable of LLAROHC, the PDSN requests the BS to establish a new A10 connection, and the BS establishes SO 61 with the MS. If there is no match, then the PDSN concludes that the packet flow carries a real time codec other than CDMA voice codecs; in this case, if the MS is capable of ROHC and currently has no auxiliary SO 33, then the PDSN requests the BS to establish a new A10 connection, and the BS establishes an auxiliary SO 33 (RLP retransmission disabled) with the MS.

It is possible that a different codec might have the same Rspec and Tspec description as a CDMA codec. For example, codec X is characterized as service rate 8 kbps, 20-ms constant inter-packet interval, and maximum packet size of 171 bits plus header overhead, which is same as the EVRC characterization. This contribution recommends that 0-byte header compression is applied to the packet flow carrying codec X, as if it was EVRC. Although the lower-rate frame sizes of codec X might be different from that of EVRC, each lower-rate frame can be padded and fitted into a CDMA physical-layer frame (full, ½, ¼, or ⅛).

Figure 3:
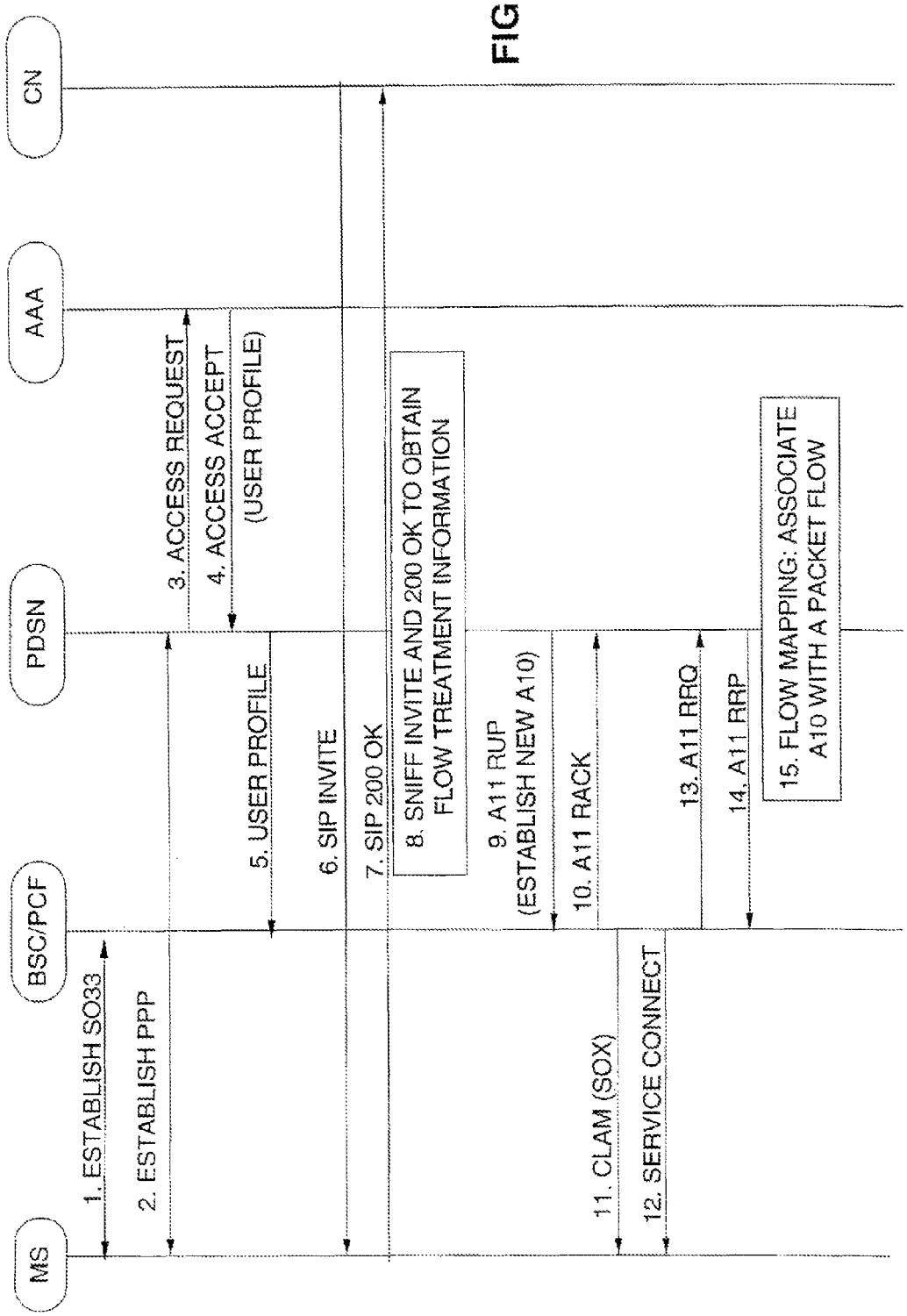
FIG. 3 is a call flow for a processing wherein a PDSN determines the flow treatment and the mapping from "sniffing" Session Initiation Protocol (SIP) messages.

FIG. 3 illustrates the call flow processing wherein the PDSN determines flow treatment and/or mapping from "sniffing" SIP messages. Sniffing refers to a process of examining messages looking for specific information. Typically, a node will sniff for specific information while ignoring all other information. In the embodiment illustrated in FIG. 3, the PDSN sniffs for the specific information desired to determine treatment of a given packet flow and/or for mapping of a given packet flow. The PDSN sniffs the SIP signaling messages. The PDSN ignores other content of the SIP message. Alternate embodiments may apply other content in the SIP message for such processing or for other operation of the PDSN.

The embodiment illustrated in FIG. 3 provides an alternate method to determine flow treatment and flow mapping information, wherein such determination is based on the PDSN sniffing Session Initiation Protocol (SIP) messages. This method relies on the PDSN to sniff SIP messages to determine the IP addresses, port numbers, and codec of a new packet flow that will be generated by the CN. This provides sufficient information for the PDSN to determine flow treatment and flow mapping. The PDSN also determines whether or not a new A10 connection is needed to transport the packet flow. If needed, the PDSN requests the BS to establish the A10 connection, and the BS initiates the establishment of a new service instance with the MS.

Sniffing SIP messages requires the PDSN to recognize that an IP packet is carrying a SIP message and pick out the essential information from the SIP message. The PDSN examines the destination port number of a packet. If it is equal to 5060, then the transport payload is carrying a SIP message. Note that there are many SIP messages and fields. The PDSN pays attention to the SIP INVITE and SIP 200 OK messages and may choose to ignore the other SIP messages. Note that SIP defines a variety of messages. The SIP INVITE message indicates that a user or service is being invited to participate in a session. An SIP 200 OK message indicates that a request has succeeded. Within the SIP INVITE and SIP 200 OK messages, the PDSN pays attention to the connection field that conveys the IP address information, the media field that conveys the port number information, and the attribute field that conveys the codec type. Based on the codec type, the PDSN determines which header compression type should be used on the packet flow. For example, if the codec type indicates a CDMA codec (e.g., PureVoice, EVRC, or SMV), Link-Layer-Assisted Robust Header Compression (LLAROHC) will be used; if the codec type indicates a codec other than a CDMA codec, Robust Header Compression (ROHC) will be used. Alternate systems may support any of a number of codec types, and the specific details provided herein serve as an example.

After the PDSN determines the header compression type, the PDSN determines whether or not a new A10 connection is needed for the new packet flow. If needed, the PDSN requests the BS to establish the A10 connection, and the BS initiates the establishment of a new service instance with the MS. Upon successful establishment of the A10 connection, the PDSN associates the A10 connection with the packet filters obtained from sniffing the SIP messages, i.e., the connection field and media field of the SIP INVITE and SIP 200 OK messages.

Figure 5:
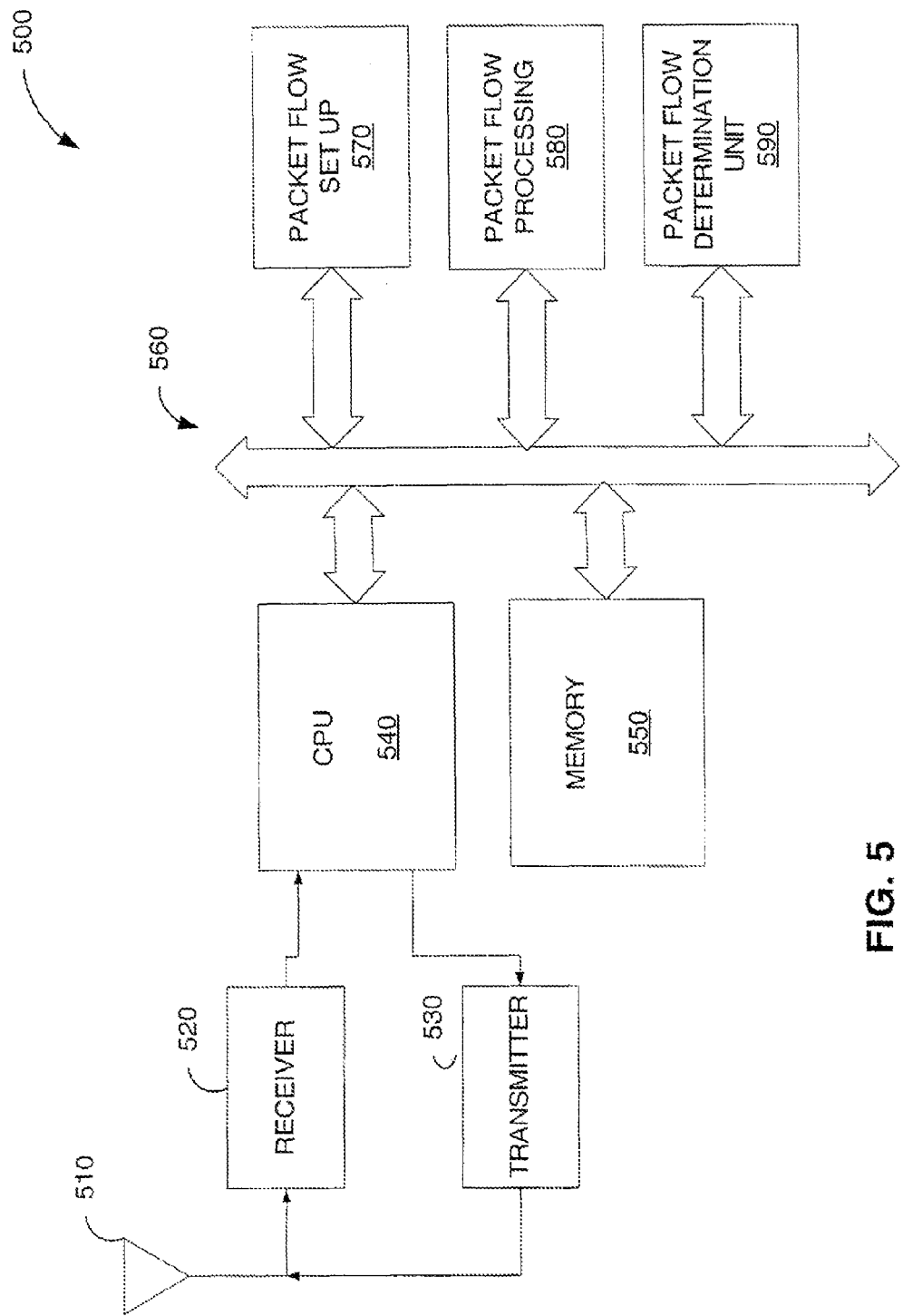
FIG. 5 is a mobile station adapted to process packet flows

FIG. 5 illustrates a MS 500 adapted for processing packet flows. The MS 500 includes an antenna 510, a receiver 520 and a transmitter 530. The receiver 520 and the transmitter 530 are each coupled to a Central Processing Unit (CPU) 540. The CPU 540 and a memory 550 are each coupled to a communication bus 560. Additionally, a packet flow set up unit 570, a packet flow processing unit 580, and a packet flow determination unit 590 are each coupled to the communication bus 560. The packet flow determination unit 590 determines the whether the communication is bi-directional or uni-directional. The packet flow set up unit 570 determines the specifics of the packet flow, such as codec type, header compression. The packet flow set up unit 570 and the packet flow determination unit 590 are involved in the initial access and set up for the transmission of the packet flow, such as illustrated in FIGS. 2 and 3. Once the communication is established, the packet flow processing unit 580 processes the packet flow according to the specific parameters established.

The present invention provides a flexible method for communicating packet flow parameters in RSVP messages without depending on Differentiated Service Code Point (DSCP) which is conveyed in a field of the IP header, protocol types, and well-known port numbers. The use of a message such as the RSVP message may be used for both bi-directional and uni-directional packet flows.

The use of existing messages to provide the packet flow information accomplishes an efficient air-resource allocation and use criteria. In one embodiment, the new bearer connection for the communication, i.e., new A10 connection, is not established until the RSVP reservation is authorized. This avoids requiring termination of the bearer connection (i.e., auxiliary SO, A8/A10 connections) on refusal.

Figure 6:
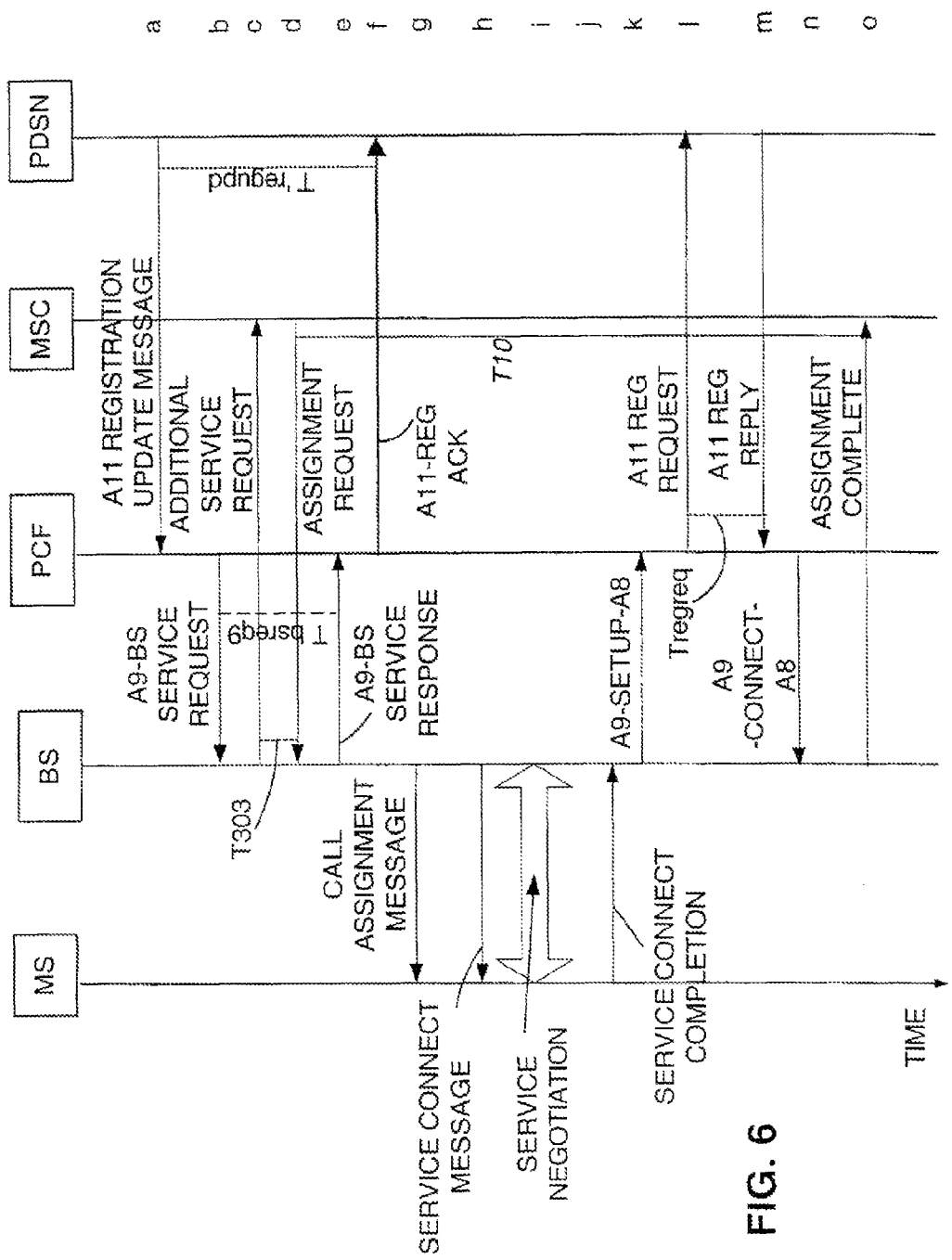
FIGS. 6-8 illustrate packet flow processing according to various embodiments.

In an alternate embodiment additional service instance setup may be initiated as illustrated in FIG. 6. The call flow diagram of FIG. 6 illustrates the additional service instance setup procedure when the MS is already active with a main service instance established. The procedure is as follows:

At the point a, the PDSN decides to establish the additional service instance; the PDSN sends an A11-Registration Update to the PCF. The A11-Registration Update message allows the PDSN to indicate the applied header compression algorithm. The PDSN starts the timer associated with the Registration Update message, referred to as the timer "T'regupd."

At point b, the PCF sends an A9-BS Service Request message to the BS in order to request an additional service instance, and starts timer referred to as timer "$T_{bsreq9}$." The mapping between the header compression algorithm and the service option may be performed in the PCF or the BS. According to one embodiment the determination is made by TSG-A (Technical Specification Group). If the mapping is performed by the PCF, no change is made to the existing A9-BS Service Request message. If the mapping is performed in the BS, the PCF will indicate the applied header compression algorithm to the BS in the A9-BS Service Request message. For example; the mapping table may be specified as follows:

| Header Compression Algorithm | Service Option |
|---|---|
| ROHC | SO33 |
| LLAROHC | SO60 or SO61 |

At step c, the BS sends an Additional Service Request message to the MSC and starts the timer referred to as timer "$T_{303}$," to reconnect the additional service instance.

At step d, the MSC sends an Assignment Request message to the BS to request assignment of radio resources and the A8 (e.g., User Traffic) connection between the BS and the PCF. The MSC then starts the timer referred to as timer "$T_{10}$." Upon receipt of the Assignment Request message from the MSC, the BS stops timer $T_{303}$.

At step e, the BS responds with an A9-BS Service Response. The PCF stops the timer $T_{bsreq9}$ upon receipt of the A9-BS Service Response message.

At step f, upon receiving the successful A9-BS Service Response message from the BS, the PCF responds with an A11-Registration Acknowledgement. The PDSN stops the timer T'regupd.

At step g, the BS may send a Call Assignment Message over the traffic channel of the radio interface to initiate the establishment of a CC state machine (Call Control state machine).

At step h, the BS sends one of: i) the Service Connect Message; ii) General Handoff Direction Message; or iii) Universal Handoff Direction Message, to the MS to invoke the additional service option connection.

At step i, the service negotiation may be performed between the MS and the BS. At step j, the MS responds with a Service Connect Completion Message upon the completion of the service negotiation procedure.

At step k, the BS sends an A9-Setup-A8 message to the PCF to establish A8 (i.e., User Traffic) connection between the BS and the PCF for the additional service instance, over the A9 (e.g., Signaling) connection. The BS then starts the timer referred to as timer "$T_{A8\text{-}Setup}$."

At step l, the PCF recognizes there is an A10 connection associated with this mobile and that an additional A10 connection needs to be setup. The PCF sends an A11-Registration Request message to the corresponding PDSN. The PCF starts the timer referred to as timer "T'regreq."

At step m, the PDSN accepts the connection by returning an A11-Registration Reply message with an accept indication.

At step n, the PCF responds with an A9-Connect-A8 message to complete the setup of A8 (e.g., User Traffic) connection for this packet service request. Upon receipt of the A9-Connect-A8 message from the PCF, the BS stops timer $T_{A8\text{-}Setup}$.

At step o, after the radio service connection and the A10 connection have been established, the BS sends an Assignment Complete message to the MSC. The MSC then stops timer $T_{10}$ when the MSG sends an Assignment Request Message (see step d).

Note that The PDSN may initiate a request for addition of a new A10 connection by using the messages as supported by the system. The PDSN sends the A11-Registration Update message to the PCF to request addition of a new A10 connection. The PDSN sends the A11-Registration Update message with the Code field in the message set to 'Add New Connection' to request PCF establishing a new A10 connection. The PDSN then starts the timer associated with the registration update, referred to as "T'regupd," after sending the A11-Registration Update message and waits for an A11-Registration Ack message from the PCF.

If timer T'regupd expires, the PDSN may resend the A11-Registration Update message to the PCF a configurable number of times. After a configurable number of retransmissions without a response from the PCF, the session establishment procedure may be considered as a fail, however the existing A10 connection(s) will remain connected.

The PCF sends the A11-Registration Acknowledge message to the PDSN to acknowledge the requested A10 connection is accepted if the requested operation can be successfully supported by the BS, PCF, and MSC.

Upon receipt of an A11-Registration Update message with the Code field of the message set to 'Add New Connection', if the PCF supports the requested A10 connection, the PCF will send an A9-BS Service Request message to the BS. If the MSC and BS support the new connection, the PCF will so indicate by setting the Status field in the message to 'New Connection Accepted'. Upon receipt of the message, the PDSN will stop the timer T'regupd when A11-Registration Update message is sent and stops when A11-Ack is received.

Upon receipt of an A11-Registration Update message with the Code field of the message set to 'Add New Connection', if the PCF does not support the requested A10 connection, or the requested connection is denied by A9-BS Service Response message received from the BS, the PCF will so indicate by setting the Status field in the message to 'New Connection Denied'. Upon receipt of the message, the PDSN stops the timer T'regupd.

If the PDSN fails to receive an A11-Registration Acknowledge message from the PCF, the PDSN may resend A11-Registration Update message a configurable number of times before considering the new establishment failed.

Each of the messages described hereinabove may include any number of fields and codes as defined by the system. For example, as proposed for design in 3GPP2, the A11-Registration Update message includes a Code. The Code information element is included when the message requests an additional connection or requests an update to the existing connection. The Code element identifies the result of processing an A11-Registration Request message. For example, the Code (decimal) 33 indicates "Add New Connection."

Similarly, The A11-Registration Update message has an associated Status element that identifies the result of processing an A11-Registration Update message. For example, the Status (decimal) 149 indicates "New Connection Accepted;" and the Status (decimal) 150 indicates "New Connection Declined."

Further, a Normal Vendor/Organization Specific Extension (NVSE)—Application Type of (hex value) 0AH indicates the Header Compression Algorithm. Application subtypes are then used to identify the specific algorithm. For example, (hex value) 01H identifies Robust Header Compression (ROHC), while (hex value) 02H identifies Link-Layer Assisted ROHC (LLAROHC). An MN Session Reference ID field is used to uniquely identify a packet data service instance in the mobile. The MN Session Reference ID is passed to the PCF from the mobile. For Application Type 0AH (Header Compression Algorithm), the MN Session Reference ID field contains the header compression algorithm in octet 11.

The Multi-Channel Flow Treatment Protocol (MCFTP) is defined as a new PPP protocol type. MCFTP carries information about the binding between packet flows and $SR_{ID}$ for 0 byte header compression such as how flows should be mapped onto underlying service instance connections, between the MS and PDSN. The MCFTP also carries the IR-Static information from the MS to the PDSN if header removal mode is used between the MS and PDSN. The information elements of MCFTP are designed along Type, Length, Value (TLV) principles that allow easy expansion of the protocol when needed.

Figure 9:
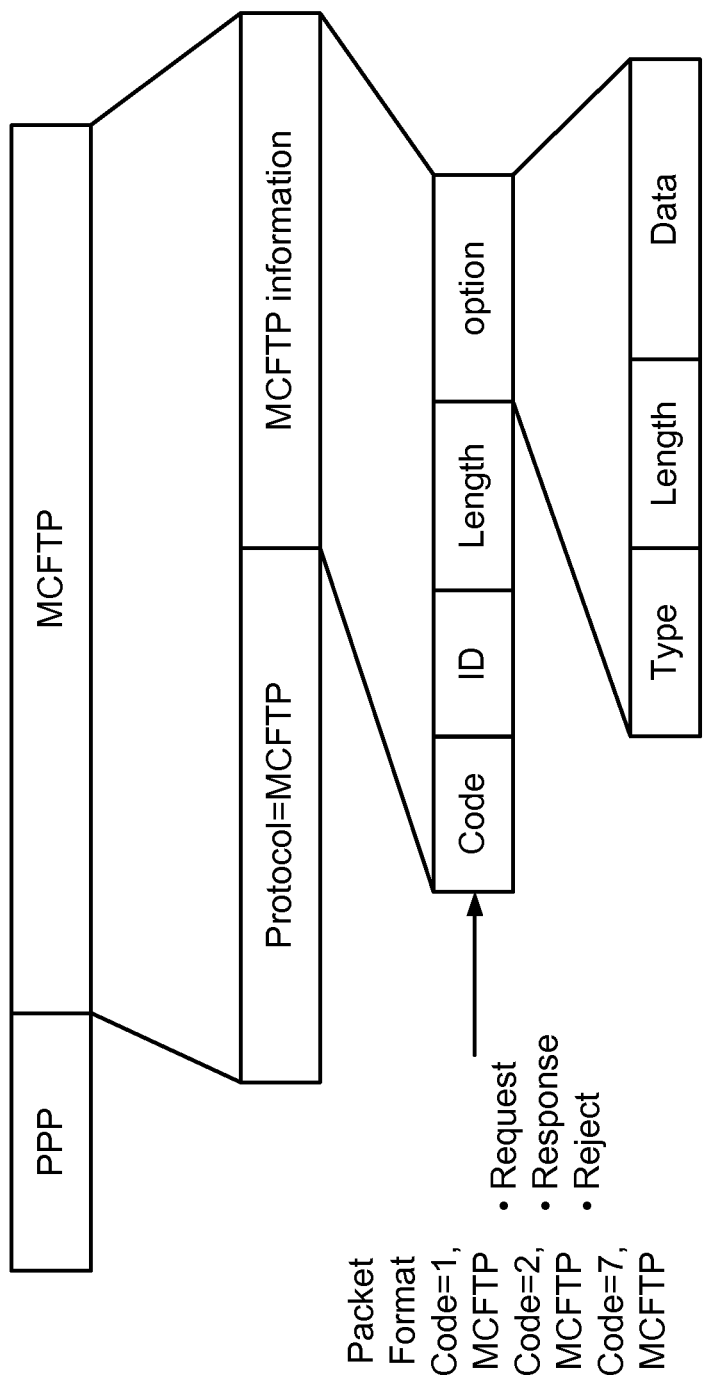
FIG. 9 is a Multi-Channel Flow Treatment Protocol (MCFTP) packet format.

Before any MCFTP packets may be communicated, PPP will reach the Network-Layer Protocol Phase. An MCFTP packet is illustrated in FIG. 9. More than one MCFTP packet may be encapsulated in the PPP Information Fields, wherein the protocol number indicates protocol x0289 (MCFTP). MCFTP uses three basic message formats:

MCFTP-Request (operation code=1)

MCFTP-Response (operation code=2)

MCFTP-Reject (operation code=7).

MCFTP-Request Message format is sent with code equal to 1 and contains the fields illustrated in Table 1.

TABLE 1

| MCFTP Request Message Format | | |
|---|---|---|
| Field | Field Length | Value |
| Code | 1 byte | 1 |
| ID | 1 byte | An ID field identifying a request set by the requestor. |
| Length | 2 bytes | Full length for the packet in bytes |
| Option | Variable (TLV format) | Traffic Flow Template (TFT): Type = 1 |

An MCFTP-Response Message is sent in response to a MCFTP-Request Message that was successfully received and processed. It is simply an MCFTP packet with either an empty body or IR-Static information included. MCFTP-Response Message format is sent with the code equal to 2 and contains the fields illustrated in Table 2.

TABLE 2

| MCFTP Response Message Format | | |
|---|---|---|
| Field | Field Length | Value |
| Code | 1 byte | 2 |
| ID | 1 byte | An ID field used to match the corresponding request. |
| Length | 2 bytes | Full length for the packet in bytes |
| Option | Variable (TLV format) | IR-Static: Type = 1 |

An MCFTP-Reject message is sent in response to an MCFTP-Request message that could not be processed, such as when the receiver was unable to identify a received option or sub-option. The MCFTP-Reject packet format is sent with code equal to 7 and contains the fields illustrated in Table 3.

TABLE 3

| MCFTP Reject Packet Format | | |
|---|---|---|
| Field | Field Length | Value |
| Code | 1 byte | 7 |
| ID | 1 byte | An ID field used to match the corresponding request. |
| Length | 2 bytes | Full length for the packet in bytes |

TABLE 3-continued

MCFTP Reject Packet Format

| Field | Field Length | Value |
|---|---|---|
| Reject-code | 1 byte | 1 Packet filter add failure<br>2 Packet filter unavailable<br>3 Unsuccessful TFT processing<br>4 Evaluation precedence contention<br>5 Flow treatment not supported |

According to one embodiment, a method for flow mapping, a simplified MCFTP method is combined with a localized RSVP method. Specifically, the simplified MCFTP is only used for 0 byte header compression for establishing a binding between SR_ID (Service Reference Identification) and IP flow because no Context ID (CID) in 0 byte header compression NHP packet. The simplified MCFTP runs over PPP instead of UDP as MCFTP contains link layer parameters such as SR_ID binding and IR-Static for 0 byte header compression removal mode. The localized RSVP is used to trigger the PDSN sending MCFTP request to the mobile node. This method uses standard localized. RSVP messages and objects. Existing RSVP objects convey sufficient information for the PDSN to determine the codec characteristics and hence which header compression method should be used on the packet flow. No 3GPP2-specific RSVP objects are required. The PDSN also determines whether or not a new A10 connection is needed to transport the IP flow. If needed, the PDSN requests RN to establish the A10 connection, and the RN initiates the establishment of a new service instance with the MS and service negotiation may be performed between the MS and RN. After the new service instance is established, the PDSN will send MCFTP over PPP to indicate the binding between IP flow and SR_ID. If header removal mode is used, the MS will send IR-Static parameters to the PDSN by using MCFTP over PPP.

Figure 7:
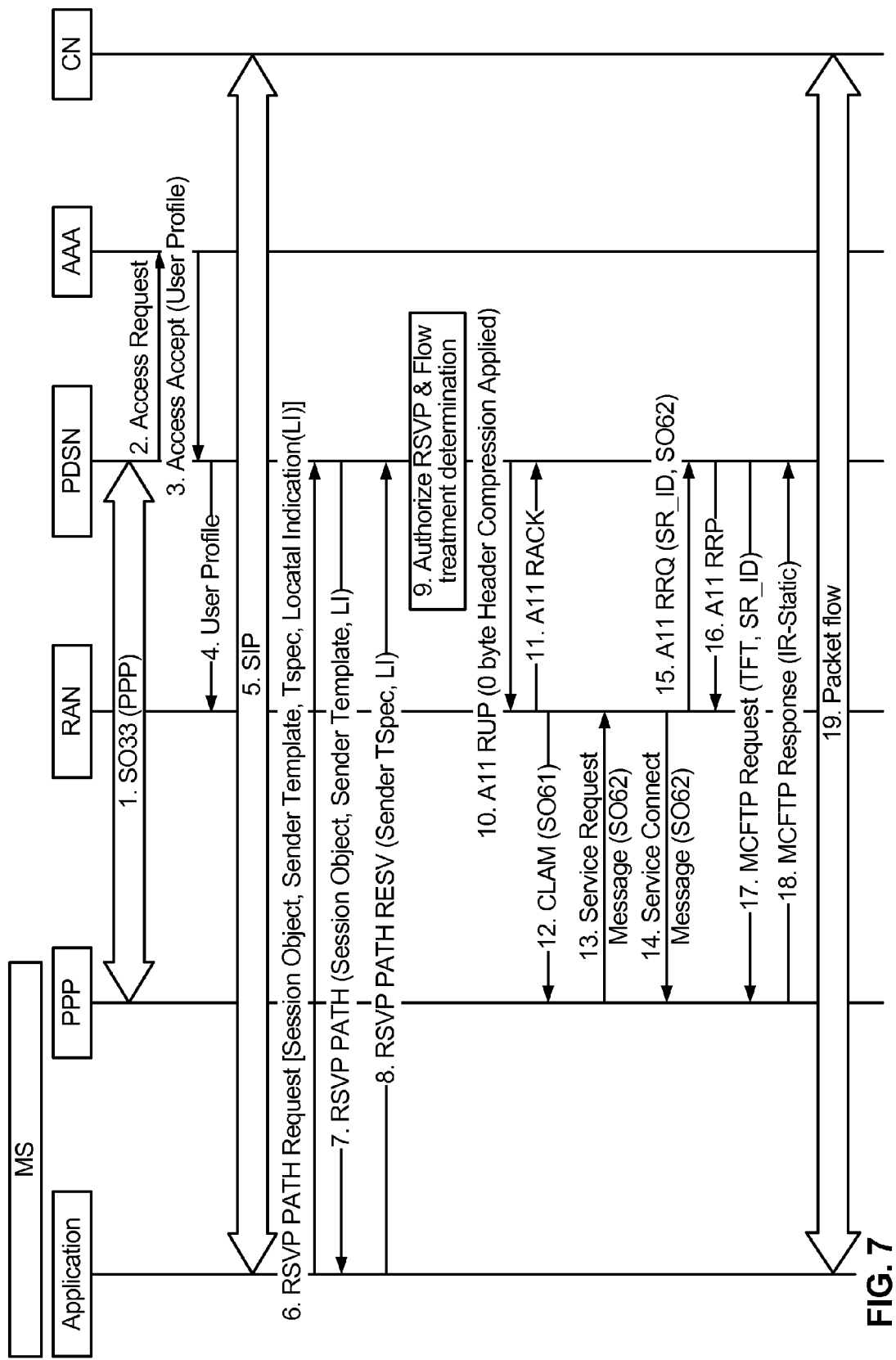

FIG. 7 illustrates how the PDSN and the MS determine flow treatment and mapping for packet flow to be generated by the Correspondent Node (CN).

1. The mobile establishes the main service instances (i.e., SO 33 with RLP retransmissions enabled). The mobile later sends SIP and RSVP messages via the main service instance that provides reliable transport over the air. The mobile establishes a PPP session with the PDSN. The mobile indicates its header compression capabilities (e.g., ROHC, LLAROHC, VJHC) to the PDSN during the PPP IPCP phase.

2. The PDSN sends an Access Request to AAA containing the mobile's Network Access Identifier (NAI) and credential. The credential is an authenticator computed by the mobile in response to CHAP (if Simple IP is used) or FA Challenge (if Mobile IP is used).

3. If the mobile is authenticated successfully, the AAA sends an Access Accept containing the user subscription profile.

4. The PDSN may forward the user subscription profile to the RN. At this time, PDSN can establish the packet filter for main service instance as follows. All incoming IP packets are matched to a GRE Tunnel (A10 connection) x if the destination IP address is matched.

TABLE 4

User Subscribtion Profile Information

| GRE Key | x |
|---|---|
| Source IP Address | * |
| Source Port Number | * |
| Destination IP Address | MS IP Address |

TABLE 4-continued

User Subscribtion Profile Information

| Destination Port Number | * |
|---|---|
| IP Protocol | * |

Note that the designation "*" indicates a wild match.

5. Sometime later, the mobile and the CN exchange SIP signaling.

6. Triggered by the SIP signaling (e.g., 183 Session Progress), the mobile sends PATH Request Message to PDSN to signal the Local RSVP proxy to initiate the RSVP reservation setup on behalf of the sender (i.e., CN). The PATH Request Message is destined for the PDSN. The mobile discovers the PDSN's IP address during IPCP. The Path Request message with the LI (Localized Identification) flag set is identical to a standard Path message apart from the message type field. The Path Request message includes the Session Object, the Sender Template to define expected sender, and the Traffic specification (TSpec) based on the mobile users wishes or a best estimate of the incoming traffic characteristics, or on application level session signalling (e.g., SIP) prior to the transfer.

7. When the PDSN, or Local RSVP proxy, receives the Path Request message, the PDSN detects that the message is meant to stay within the access network. The message type indicates that the proxy should initiate an RSVP reservation for a downstream (flow and use the information in the message to fill the field in a Path message. Therefore, the PDSN sends a Path Message to the mobile node with the LI flag set. Since the Session Object and Sender Template were originally set "backwards", the proxy can copy these entries directly as-is to the Path message.

8. The mobile node responds with RESV message with LI flag set.

9. Upon receiving the RSVP RESV message, the PDSN performs authorization based on the PDSN loading and local policy, mobile reachability, and user's IP subscription profile. If authorized, the PDSN determines flow treatment and mapping based on the Flow Spec and Filter Spec:

The PDSN uses the Flow Spec to determine which header compression method should be used on the packet flow. The Flow Spec includes the Reservation Spec (Rspec) and Traffic Spec (Tspec). The Rspec describes the service rate, and the Tspec describes the token bucket parameters (bucket rate, peak rate, bucket dept, maximum packet size) to characterize the traffic that the CN will generate. The Rspec and Tspec together can characterize a CDMA voice codec (13-kbps PureVoice, 8-kbps EVRC, 8-kbps SMV, or 4-kbps SMV) that outputs a voice frame every 20 ms. Note that alternate codecs may have a same Rspec and Tspec description. For example, codec X is characterized as service rate 8 kbps, 20-ms constant inter-packet interval, and maximum packet size of 171 bits plus header overhead, which is same as the. EVRC characterization. A 0-byte header compression may be applied to the packet flow carrying codec X, as if it was EVRC. Although the lower-rate frame sizes of codec X might be different from that of EVRC, each lower-rate frame can be padded and fit into a CDMA physical-layer frame (full, ½, ¼, or ⅛).

The PDSN is configured to recognize the CDMA voice codec based on the parameter values in the Flow Spec. If there is a match, and the MS is capable of LLAROHC, the PDSN requests the RN to establish a new A10 connection, and the RN establishes SO 61 with the MS. If there is no match, then the PDSN concludes that the IP flow carries a realtime codec other than CDMA voice codecs; in this case, if the MS is capable of ROHC and currently has no auxiliary data service option SO 33, then the PDSN requests the RN to establish a new A10 connection, and the RN establishes an auxiliary SO 33 (RLP retransmission disabled) with the MS.

The PDSN uses the Filter Spec for flow mapping. The Filter Spec conveys the source address and port number of a packet flow that will be generated by the CN. If the PDSN requests a new A10 connection, the PDSN associates the new connection with the packet flow described in the Filter Spec.

10. If the PDSN determines that a new A10 connection is desired for the packet flow, the PDSN sends an A11 Registration Update (RUP) Message to the RN to request a new A10 connection. The message conveys an indication that will trigger the RN to establish an appropriate SO with the MS. The message may also convey QoS parameters that might be needed in the SO establishment.

11. The RN responds with an A11 Registration Acknowledgement (RACK) Message if RN can support the new A10 connection requested by the PDSN.

12. The RN attempts to connect the SO specified in the A11 signaling message to the MS via a Call Assignment Message.

13. The RN and the mobile will perform service negotiation to agree upon an SO. In this example, the MS requests SO62 designating Header Removal Mode.

14. The RN assigns an SR_ID and connects SO62. Table 5 indicates RN establishment.

TABLE 5

| RN Establishment Information | |
|---|---|
| SO | 33 |
| SR_ID | 1 (main SI setup in step 1) |
| GRE key | x |
| SO | 62 |
| SR_ID | 2 |
| GRE key | y |

15. The RN sends an A11 RRQ to establish a new A10 connection. In the A11 RRQ message, the RN also indicates an SR_ID and the service option that is connected over the air.

16. The PDSN responds with an A11 RRP. Upon successful establishment of the new A10 connection, the PDSN associates the newly established A10 connection with the forward-direction packet filters obtained from the Filter Spec of the RSVP message. At this time, PDSN may establish the packet filter for both the main service instance and the auxiliary service instance. In this case, the PDSN will apply the packet filter for the auxiliary service instance first.

TABLE 6

| Designations for Packet Filter | |
|---|---|
| GRE Key | x |
| Source IP Address | * |
| Source Port Number | * |
| Destination IP Address | MS IP Address |
| Destination Port Number | * |
| IP Protocol | * |
| GRE Key | y |
| Source IP Address | CN IP address |
| Source Port Number | CN port number |
| Destination IP Address | MS IP Address |
| Destination Port Number | MS port number |
| IP Protocol | UDP |
| Header Treatment | LLAROHC Header Removal Mode |

17. The PDSN sends an MCFTP Request over PPP (main Service Instance) to the MS indicating the binding of the SR_ID and the IP flow.

18. The MS sends the MCFTP Response to the PDSN indicating the SR-Static information as the SO62 (LLAROHC Header Removal Mode) is used in this example.

19. The IP packets may begin to flow between the application and the CN.

The call flow of flow mapping and treatment for ROHC is similar as LLAROHC, except MCFTP is not needed as the Context ID (CID) is included in each ROHC packet so that the receiving side can distinguish the IP flow via the CID.

Figure 8:
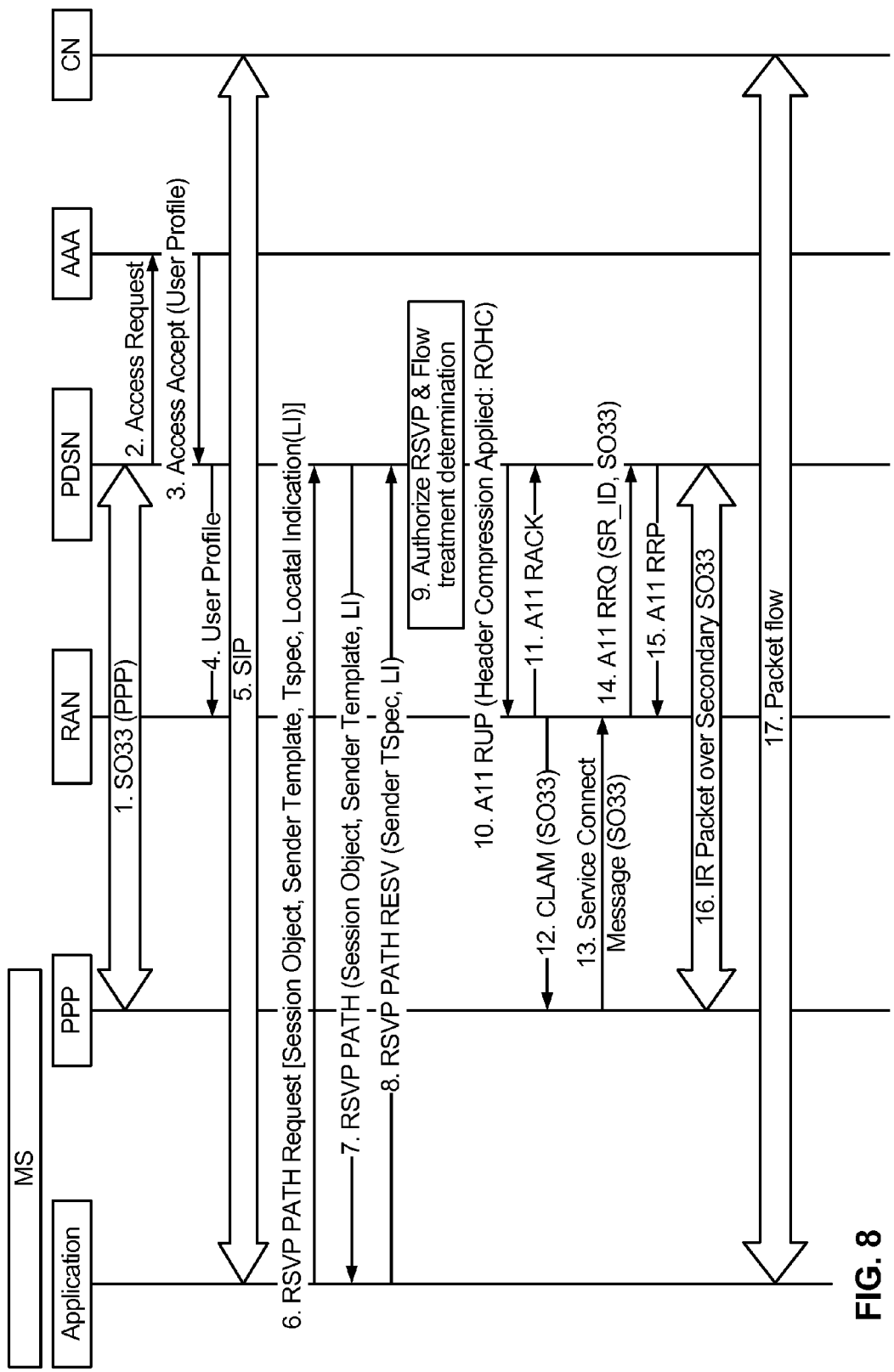

FIG. 8 describes how the PDSN and the MS determine the flow treatment and the mapping for a packet flow to be generated by the Correspondent Node (CN) for ROHC. Note that the first step 1 to step 9 are as illustrated in FIG. 7. The following description begins at step 10 in FIG. 8.

10. If the PDSN determines that a new A10 connection is needed for the packet flow, the PDSN sends an A11 Registration Update (RUP) Message to the RN to request a new A10 connection. The message conveys an indication that will trigger the RN to establish an appropriate SO with the MS. The message may also convey Quality of Service (QoS) parameters that may be needed in the SO establishment.

11. The RN responds with an A11 Registration Acknowledgement (RACK) Message if the RN can support the new A10 connection requested by the PDSN.

12. The RN attempts to connect SO33 to the MS via a Call Assignment Message.

13. The RN assigns an SR_ID and connects SO33 to the mobile.

TABLE 7

| RN Establishment | |
|---|---|
| SO | 33 |
| SR_ID | 1 (main SI setup in step 1) |
| GRE key | x |
| SO | 33 |
| SR_ID | 2 |
| GRE key | y |

14. The RN sends an A11 RRQ to establish a new A10 connection. In this message the RN also indicates an SR_ID and the service option that is connected over the air.

15. The PDSN responds with an A11 RRP. Upon successful establishment of the new A10 connection, the PDSN associates the newly established A10 connection with the forward-direction packet filters obtained from the Filter Spec of the RSVP message. At this time, the PDSN may establish the packet filter for both the main service instance and the auxiliary service instance. In this case, the PDSN will apply the packet filter for the auxiliary service instance first.

TABLE 8

| Packet Filter Information | |
|---|---|
| GRE Key | x |
| Source IP Address | * |
| Source Port Number | * |
| Destination IP Address | MS IP Address |
| Destination Port Number | * |
| IP Protocol | * |
| GRE Key | y |
| Source IP Address | CN IP address |
| Source Port Number | CN port number |
| Destination IP Address | MS IP Address |

TABLE 8-continued

Packet Filter Information

| | |
|---|---|
| Destination Port Number | MS port number |
| IP Protocol | UDP |
| Header Treatment | ROHC |

16. Both the MS and PDSN send IR (Initialization and Refresh) packets over secondary SO3.

17. The IP packtes can flow between application and CN.

For LLA-ROHC, MCFTP provides several advantages. The PDSN uses MCFTP to convey the binding of the packet filter and the SR_ID to MS. The need for MCFTP is illustrated in the following TE-MT (Terminal Equipment-Mobile Terminal) example. For some reasons, the TE (e.g., laptop) may desire to establish two Voice over IP (VoIP) sessions simultaneously, each using EVRC. Although the MT (e.g., network-model handset) can sniff the RSVP messages that contain packet filter information for both VoIP flows, the MT does not know the binding between the packet filter and the SR_ID unless the PDSN uses MCFTP to notify the MT about the binding. Note: In this example, the RSVP parameters for both VoIP sessions that use EVRC would look exactly the same to the MT.

In the case of header removal mode, the MS needs to use MCFTP to convey "full header" information to the PDSN. Note that LLA-ROHC is a link layer assisted header compression. In addition, the header removal mode is 3GPP2 specific mode; therefore it is not a problem to create a 3GPP2 specific link protocol (simplified MCFTP) to assist the operation.

For ROHC, MCFTP is not needed even when the TE wants to establish two real-time sessions simultaneously. For example, using non-COMA codecs that cannot take the advantage of 0-byte header compression. Based on the RSVP parameters, the MT that sniffs the RSVP messages would know whether or not the two real-time sessions require similar over-the-air QoS. This example further considers the following two cases:

1. If the sessions require similar over-the-air QoS, only one secondary SO 33 is needed for both flows, and the MT can map the packet filters of the flows to the same SR_ID corresponding to the secondary SO 33. Based on the RSVP parameters, the network side would make the same conclusion resulting in the PDSN triggering the RAN to establish one secondary SO 33 for both flows. During ROHC initialization, the MT sends the ROHC IR packets (via the secondary SO 33) to the PDSN, and header compression state for each flow is identified by a CID.

2. If the sessions require different over-the-air QoS (e.g., one requires no RLP retransmissions, and one requires RLP retransmission with maximum retransmission equal to one), two secondary SO 33s are needed. The MT, based on the RSVP parameters, knows which IP flow should be sent on which secondary SO 33; thus, the MT knows the binding between the packet filter and the SR_ID. During ROHC initialization, the MT sends the ROHC IR packet for each real-time session on the appropriate secondary SO 33, and the IR packet is received by the PDSN on a corresponding A10 connection. The IR packet has enough packet filter information for the PDSN to bind it with the appropriate A10 connection.

The PPP frame (instead of the UDP datagram) is recommended for MCFTP is based on the layering principle. The use of MCFTP conveys: i) the binding between the packet filters and the SR_ID; and ii) the "full header" information when the LLA-ROHC header removal mode is used. As the MCFTP is used for conveying link-layer related information, MCFTP should be transported at the link layer (e.g., PPP). Using UDP to transport MCFTP strictly speaking is a "layer violation" and as such, is not recommended. The method described herein relies on the existing RSVP parameters (Flow Spec and Filter Spec) to establish the packet filter in the PDSN. One example for setting token bucket parameters for an EVRC codec is listed as follows:

Bucket depth=1 (The source is Constant Bit Rate)

Peak rate=(176 bits/full-rate frame)*(50 full-rate frame/sec)+(320 IP overhead bits/frame)*(50 frames/sec)= 24.8 kbps Maximum packet size=176 bits+320 overhead bits=496 bits The existing RSVP parameters are sufficient to establish the packet filter in PDSN. The method described herein is very clean without layering violations. Further, standard RSVP objects and behaviors are used, without requiring any 3GPP2-specific RSVP object. Simplified MCFTP is only limited to link layer assisted 0 byte header compression. This simplified MCFTP is easy to implement for both MS and PDSN. The present method does not require a special Application Programming Interface (API) between the laptop and mobile terminal, as it relies on the network to initiate the establishment of SO and negotiate service configurations between the mobile and network. Although the interface between MCFTP module and LLAROHC module is needed to convey the information of TFT (Traffic Flow Template) and SR_ID, it can be totally controlled by the mobile terminal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system: Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method operable by an infrastructure entity in a communication system, comprising:
    examining a data packet exchanged between at least two communication entities;
    detecting packet flow parameter information from the data packet; and
    determining packet flow treatment of data packets exchanged between the at least two communication entities based on the packet flow parameter information detected from the data packet, wherein the data packet exchanged is received from a mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used.

2. The method as in claim 1 further comprising establishing a bearer connection between the at least two communication entities after packet flow treatment is determined.

3. The method as in claim 2 further comprising establishing a new connection between the infrastructure entity and one of the at least two communication entities as part of the bearer connection.

4. The method as in claim 1 wherein the session initiation message further indicates at least one of quality of service and header compression.

5. The method as in claim 4 wherein determining packet flow treatment includes authorizing use of the packet flow parameter information.

6. A method operable by a mobile station in a communication system, comprising:
    sending a data packet which includes packet flow parameter information to another communication entity via an infrastructure entity which determines packet flow treatment of data packets exchanged between the mobile station and the another communication entity, wherein the data packet exchanged is sent from the mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used; and
    receiving a message for establishing connection if the infrastructure entity determines a new packet flow treatment is needed.

7. The method as in claim 6 further comprising communicating with the another communication entity via a bearer connection which includes a new connection between the infrastructure entity and the mobile station.

8. The method of as in claim 6 wherein the session initiation message further indicates at least one of quality of service and header compression.

9. The method as in claim 7 wherein determining packet flow treatment includes authorizing use of the packet flow parameter information.

10. An infrastructure entity in a communication system, comprising:
    means for examining a data packet exchanged between at least two communication entities;
    means for detecting packet flow parameter information from the data packet; and
    means for determining packet flow treatment of data packets exchanged between the at least two communication entities based on the packet flow parameter information detected from the data packet, wherein the data packet exchanged is received from a mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used.

11. The infrastructure entity as in claim 10 further comprising means for establishing a bearer connection between the at least two communication entities after packet flow treatment is determined.

12. The infrastructure entity as in claim 11 further comprising establishing a new connection between the infrastructure entity and one of the at least two communication entities as part of the bearer connection.

13. The infrastructure entity of as in claim 10 wherein the session initiation message further indicates at least one of quality of service and header compression.

14. The infrastructure entity as in claim 13 wherein the means for determining packet flow treatment includes means for authorizing the use of the packet flow parameter information.

15. A mobile station in a communication system, comprising:
    means for sending a data packet which includes packet flow parameter information to another communication entity via an infrastructure entity which determines packet flow treatment of data packets exchanged between the mobile station and the another communication entity, wherein the data packet exchanged is sent from the mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used; and means for receiving a message for establishing connection if the infrastructure entity determines a new packet flow treatment is needed.

16. The mobile station as in claim 15 further comprising means for communicating with the another communication entity via a bearer connection which includes a new connection between the infrastructure entity and the mobile station.

17. The mobile station of as in claim 15 wherein the session initiation message further indicates at least one of quality of service and header compression.

18. The mobile station as in claim 17 wherein means for determining packet flow treatment includes means for authorizing the use of the packet flow parameter information.

19. An infrastructure entity in a communication system, comprising:
circuitry configured to:
examine a data packet exchanged between at least two communication entities;
detect packet flow parameter information from the data packet; and
determine packet flow treatment of data packets exchanged between the at least two communication entities based on the packet flow parameter information detected from the data packet, wherein the data packet exchanged is received from a mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used.

20. The infrastructure entity as in claim 19 wherein the circuitry is further configured to establish a bearer connection between the at least two communication entities after packet flow treatment is determined.

21. The infrastructure entity as in claim 20 wherein the circuitry is further configured to establish a new connection between the infrastructure entity and one of the at least two communication entities as part of the bearer connection.

22. The infrastructure entity of as in claim 19 wherein the session initiation message further indicates at least one of quality of service and header compression.

23. The infrastructure entity as in claim 22 wherein the circuitry configured to determine packet flow treatment is further configured to authorize use of the packet flow parameter information.

24. A mobile station in a communication system, comprising:
circuitry configured to:
send a data packet which includes packet flow parameter information to another communication entity via an infrastructure entity which determines packet flow treatment of data packets exchanged between the mobile station and the another communication entity, wherein the data packet exchanged is sent from the mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used; and receive a message for establishing connection if the infrastructure entity determines a new packet flow treatment is needed.

25. The mobile station as in claim 24 wherein the circuitry is further configured to communicate with the another communication entity via a bearer connection which includes a new connection between the infrastructure entity and the mobile station.

26. The mobile station of as in claim 24 wherein the session initiation message further indicates at least one of quality of service and header compression.

27. The mobile station as in claim 26 wherein the circuitry configured to determine packet flow treatment is further configured to authorize use of the packet flow parameter information.

28. A non-transitory computer-readable medium comprising instructions executable to:
examine a data packet exchanged between at least two communication entities;
detect packet flow parameter information from the data packet; and
determine packet flow treatment of data packets exchanged between the at least two communication entities based on the packet flow parameter information detected from the data packet, wherein the data packet exchanged is received from a mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used.

29. A non-transitory computer-readable medium comprising instructions executable to:
send a data packet which includes packet flow parameter information to another communication entity via an infrastructure entity which determines packet flow treatment of data packets exchanged between a mobile station and the another communication entity, wherein the data packet exchanged is sent from the mobile station and comprises a session initiation message indicating that a request has succeeded and a codec type for the data packets, wherein a header compression type is determined based on the codec type, and wherein when the codec type is determined to be a non-code-division-multiple-access codec then robust header compression is used and when the codec type is determined to be a code-division-multiple-access codec then link-layer-assisted robust header compression is used; and receive a message for establishing connection if the infrastructure entity determines a new packet flow treatment is needed.

* * * * *